(12) United States Patent
Harimoto et al.

(10) Patent No.: US 8,097,690 B2
(45) Date of Patent: Jan. 17, 2012

(54) CYCLIC DIHYDROGENPOLYSILOXANES, HYDROGENPOLYSILOXANES, PROCESSES FOR THEIR PRODUCTION, SILICA TYPE GLASS MOLDINGS AND A PROCESS FOR THEIR PRODUCTION, OPTICAL ELEMENTS AND A PROCESS FOR THEIR PRODUCTION

(75) Inventors: Yukinari Harimoto, Hadano (JP); Nobuo Kushibiki, Fujisawa (JP); Maki Itoh, Tokyo (JP); Dimitris Elias Katsoulis, Midland, MI (US)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 346 days.

(21) Appl. No.: 11/997,888

(22) PCT Filed: Aug. 4, 2006

(86) PCT No.: PCT/JP2006/315901
§ 371 (c)(1),
(2), (4) Date: Apr. 7, 2010

(87) PCT Pub. No.: WO2007/018283
PCT Pub. Date: Feb. 15, 2007

(65) Prior Publication Data
US 2010/0188766 A1   Jul. 29, 2010

(30) Foreign Application Priority Data

Aug. 5, 2005  (JP) .................................. 2004-228774
Aug. 4, 2006  (WO) ................... PCT/JP2006/315901

(51) Int. Cl.
*C08G 77/12* (2006.01)
*B05D 5/06* (2006.01)
(52) U.S. Cl. ................ 528/31; 106/287.14; 106/287.34; 427/167

(58) Field of Classification Search ............. 106/287.14, 106/287.34; 528/31; 427/167
See application file for complete search history.

(56) References Cited

U.S. PATENT DOCUMENTS 2,547,678 A    4/1951   Wilcock et al.
(Continued)

FOREIGN PATENT DOCUMENTS

DE    19638998 A1    3/1997
(Continued)

OTHER PUBLICATIONS

English language abstract for DE 19638998 extracted from espacenet.com database, dated Oct. 15, 2008.

(Continued)

*Primary Examiner* — Robert Loewe
(74) *Attorney, Agent, or Firm* — Howard & Howard Attorney PLLC

(57) ABSTRACT

Cyclic dihydrogenpolysiloxanes, hydrogenpolysiloxanes of specific siloxane unit formulas etc., a process for their production using hydrolysis/condensation, a process for the production of silica type glass moldings with an optical transmittance of 90% to 100% in the vacuum-UV region to UV region and an optical transmittance of 98% to 100% in the visible region to near infrared region by curing said cyclic dihydrogensiloxanes or said hydrogenpolysiloxanes in a mold, said silica type glass moldings, optical elements made up of the silica type glass, a process for the production of optical elements having such a silica type glass film layer by coating an optical element with the hydrogenpolysiloxanes and curing them, and optical elements having such a silica type glass film layer.

15 Claims, 1 Drawing Sheet

U.S. PATENT DOCUMENTS

| | | | |
|---|---|---|---|
| 2,810,628 A | | 10/1957 | Bailey et al. |
| 2,895,853 A | * | 7/1959 | York et al. .................... 427/387 |
| 3,615,272 A | | 10/1971 | Collins et al. |
| 3,992,426 A | * | 11/1976 | Johnson et al. ............... 556/451 |
| 4,412,080 A | | 10/1983 | Williams, Jr. |
| 4,565,714 A | * | 1/1986 | Koshar .......................... 427/515 |
| 5,010,159 A | * | 4/1991 | Bank et al. ...................... 528/23 |
| 5,091,162 A | * | 2/1992 | Frye et al. ..................... 423/325 |
| 5,436,029 A | * | 7/1995 | Ballance et al. ........... 427/126.2 |
| 5,985,229 A | | 11/1999 | Yamada et al. |
| 6,143,360 A | * | 11/2000 | Zhong ........................... 427/244 |
| 2003/0171477 A1 | * | 9/2003 | Baba et al. .................... 524/492 |

FOREIGN PATENT DOCUMENTS

| | | |
|---|---|---|
| EP | 0270369 A2 | 6/1988 |
| EP | 0419076 A1 | 3/1991 |
| EP | 0479452 A2 | 4/1992 |
| EP | 0579456 A2 | 1/1994 |
| JP | 59084920 A | 5/1984 |
| JP | 60042426 A | 3/1985 |
| JP | 60086018 A | 5/1985 |
| JP | 6042477 B | 6/1994 |
| JP | 7086142 B | 9/1995 |
| JP | 2001002785 A | 1/2001 |
| JP | 3298990 B2 | 7/2002 |
| WO | WO 9847941 A1 | 10/1998 |

OTHER PUBLICATIONS

English language abstract for JP 59084920 extracted from espacenet.com database, dated Oct. 15, 2008.

English language abstract for JP 60042426 extracted from espacenet.com database, dated Oct. 15, 2008.

English language abstract for JP 60086018 extracted from espacenet.com database, dated Oct. 15, 2008.

English language translation and abstract for JP 2001-002785 extracted from PAJ, dated Oct. 20, 2008, 47 pages.

Seyferth et al, "Cyclic Polysiloxanes from the Hydrolysis of Dichlorosilane", American Chemical Society, No. 22, 1983, pp. 2163-2167.

PCT International Search Report for PCT/JP2006/315901, dated Jan. 22, 2007, 4 pages.

English language abstract for JP 3298990 extracted from espacenet.com database, dated Feb. 3, 2009.

English language abstract for JP6042477 extracted from espacenet.com database, dated Feb. 3, 2009.

English language abstract for JP 7086142 extracted from espacenet.com database, dated Feb. 3, 2009.

* cited by examiner

CYCLIC DIHYDROGENPOLYSILOXANES, HYDROGENPOLYSILOXANES, PROCESSES FOR THEIR PRODUCTION, SILICA TYPE GLASS MOLDINGS AND A PROCESS FOR THEIR PRODUCTION, OPTICAL ELEMENTS AND A PROCESS FOR THEIR PRODUCTION

RELATED APPLICATIONS

This application claims priority to and all the advantages of International Patent Application No. PCT/JP2006/315901, filed on Aug. 4, 2006, which claims priority to Japanese Patent Application No. JP2005-228774, filed on Aug. 5, 2005.

TECHNICAL FIELD

The present invention relates to cyclic dihydrogenpolysiloxanes; hydrogenpolysiloxanes comprising at least dihydrogensiloxane units and monohydrogensiloxane units or siloxane units; a process for their production using hydrolysis/condensation; a process for the production of silica type glass moldings with an optical transmittance of 90% to 100% in the vacuum-UV region at 170 nm or higher to UV region and an optical transmittance of 98% to 100% in the visible region to near infrared region up to 1700 nm by curing said cyclic dihydrogenpolysiloxanes or said hydrogenpolysiloxanes in a mold; such silica type glass moldings; optical elements made up of such silica type glass; a process for the production of optical elements with a film layer of silica type glass having an optical transmittance of 90% to 100% in the vacuum-UV region at 170 nm or higher to UV region and an optical transmittance of 98% to 100% in the visible region to near infrared region up to 1700 nm formed by coating and curing said cyclic dihydrogensiloxanes or said hydrogenpolysiloxanes on an optical member having an optical transmittance of 90% to 100% in the vacuum-UV region to UV region and an optical transmittance of 98% to 100% in the visible region to near infrared region; and to optical elements having such a silica type glass film layer.

BACKGROUND ART

Art-known polysiloxanes having hydrogen atoms directly bonded to silicon atoms in the polysiloxanes, i.e. hydrogenpolysiloxanes, include silanol-terminated polydihydrogensiloxane powders and polydihydrogensiloxane powders obtained by dimethylsilylating their terminals (see Japanese Unexamined Patent Application Publication [herein referred to as "JP Kokai"] Sho 59-84920 and JP Kokai Sho 60-42426), solvent-soluble silicone resins comprising silanol-terminated polydihydrogensiloxanes or silyl-terminated polydihydrogensiloxanes (see JP Kokai Sho 60-86018), low polymerized cyclic dihydrogenpolysiloxanes (see Inorg. Chem. 1983, 22, 2163-2167), hydrogensilsesquioxane resins (see U.S. Pat. No. 3,615,272), perhydrosiloxane copolymers of the chemical formula $[H_2SiO]_x[HSiO_{3/2}]_y$ (where x and y represent mole fractions, $0.01 \leq x \leq 0.1$, $0.9 \leq y \leq 0.99$, and x+y=1) with a molecular weight ranging in value from Mn=300 to Mw=500,000 (see Japanese Examined Patent Application Publication [herein referred to as "JP Kokoku"] Hei 7-86142), silicon hydride resins represented by the structural formula $(SiO_2)_x(RSiO_{3/2})_y(R_2SiO)_z$ (in the above structural formula, R stands for hydrogen or a hydrocarbon, with at least 20% being hydrogen, y is a mole fraction between 0.05 and not more than 1, and x and z are mole fractions between 0 (excluding 0) and 0.95) (see Japanese Patent No. 3298990) and hydridosiloxane resins represented by the formula $[H_{0.5\sim1.0}SiO_{1.5\sim1.8}]_p$ and formula $[HSiO_{1.5}]_n[SiO_2]_w$ (where p is an integer in the range of about 8 to about 5000, the sum of n and w is an integer in the range of about 8 to about 5,000, the sum of n and m is an integer in the range of about 8 to about 5,000, . . . ) (see Japanese Publication of Translation of PCT Application in Foreign Language [herein referred to as "JP Kohyo"] 2000-510522)

It is known that solutions of the above-mentioned polydihydrogensiloxanes produce silicon oxide films when subjected to heat treatment, etc., and that coating a substrate with a thin layer of a hydrogensilsesquioxane resin solution or silicon hydride resin solution, volatilizing the solvent, and heating to an elevated temperature converts it into a ceramic thin film containing silicon dioxide (i.e. silica) with a thickness of about 1 μm, but less than 2 μm (see JP Kokai Sho 60-86018 etc., JP Kokoku Sho 6-42477, and Japanese Patent No. 3298990).

However, problems with the above-mentioned polydihydrogensiloxanes include the fact that they are produced in powder form and cannot be used for coating unless dissolved in solvents, that silanol-terminated polydihydrogensiloxanes are unstable, and that polydihydrogensiloxanes with dimethylsilylated terminals have decreased inorganicity and heat resistance (see JP Kokai Sho 59-84920). The inventors herein noticed that due to the fact that the degree of polymerization of the above-mentioned low polymerized cyclic dihydrogenpolysiloxanes ranges from 4 to 23 and its main ingredient has a degree of polymerization ranging from 4 to 9, most of it volatilizes in the process of curing and cured products of the prescribed size are not obtained. Another problem is that hydrogensilsesquioxane resins, silicon hydride resins, and the above-mentioned perhydrosiloxane copolymers are solid at normal temperature and cannot be used for coating thin layers unless dissolved in organic solvents (see JP Kokoku Hei 6-42477, Japanese Patent No. 3298990, and JP Kokoku Hei 7-86142). Moreover, the inventors herein noticed that if the thickness of films obtained by coating the solutions and volatilizing the solvents reaches 2 μm or more, cracks appear in the coating films, and, even if cracks do not appear at such time, cracking starts when they are subjected to heat treatment etc. in order to convert them to silica. In addition, the inventors herein noticed that cast molding etc. is impossible and millimeter-order films, sheets, slabs, and blocks cannot be molded because the above-mentioned perhydrosiloxane copolymers, hydrogensilsesquioxane resins, and hydridosiloxane resins are solid at normal temperature and do not melt even when heated.

In addition, another problem is that the above-mentioned polydihydrogensiloxanes, which are produced by the hydrolysis/condensation of dialkoxysilanes, i.e. $H_2Si(OR)_2$, are obtained only in the form of powders that can be dissolved in solvents but do not melt when heated.

The above-mentioned hydrogensilsesquioxane resins and silicon hydride resins are produced by the "scarce water" hydrolysis method described in the Specification of U.S. Pat. No. 3,615,272, i.e., by a method, in which hydrogentrichlorosilane is hydrolyzed in benzenesulfonic acid hydrate-based hydrolysis medium and the resulting resin is then washed with water or an aqueous solution of sulfuric acid, or, more specifically, by a method, in which a benzene solution of trichlorosilane is subjected to hydrolysis/condensation via dropwise addition to a mixture of concentrated sulfuric acid, fuming sulfuric acid, and benzene, and the resulting resin is washed with water or an aqueous solution of sulfuric acid (see paragraphs [0012] and [0013] in Japanese Patent No. 3298990).

The above-mentioned perhydrosiloxane copolymers of the chemical formula $[H_2SiO]_x[HSiO_{3/2}]_y$ (where x and y represent mole fractions, $0.01 \leq x \leq 0.1$, $0.9 \leq y \leq 0.99$, and $x+y=1$) with a molecular weight ranging in value from $Mn=300$ to $Mw=500,000$, i.e hydrogensiloxane copolymers, are produced by a process involving (1) preparing a hydrolysis medium containing an arylsulfonic acid hydrate, (2) adding $HSiX_3$ and $H_2SiX_2$ (wherein X is a hydrolysable group such as Cl or an alkoxy group) to the hydrolysis medium under agitation, (3) facilitating hydrolysis of the $HSiX_3$ and $H_2SiX_2$ in the hydrolysis medium to form the copolymer, (4) settling the hydrolysis medium and copolymer into immiscible layers comprising an acid layer and an organic layer (where the organic layer contains the copolymer), and (5) separating the organic layer from the acid layer (see paragraphs from 0011 to 0031 of JP Kokoku Hei 7-86142). In Example 1, notwithstanding co-hydrolysis/condensation of 8.5 g (0.08 mol) dichlorosilane, i.e. $H_2SiCl_2$, and 9.4 g (0.07 mol) trichlorosilane, i.e. $HSiCl_3$, the produced hydrogensiloxane copolymer has a chemical formula of $(H_2SiO)_1(HSiO_{3/2})_{19}$, in other words, it has an average siloxane unit formula of $(H_2SiO)_{0.05}(HSiO_{3/2})_{0.95}$, which indicates a considerable decrease in the number of $H_2SiO$ units and a considerable increase in the number of $HSiO_{3/2}$ units. The rate of introduction of $H_2SiO$ units was poor, and in fact, it was possible to produce only hydrogensiloxane copolymers having 5 mol % or less of $H_2SiO$ units. As a result, it has been impossible to significantly improve the physical properties of hydrogensilsesquioxanes which, similarly to hydrogensilsesquioxane resins, are solid at normal temperature. For this reason, they are typically spin-coated, spray-coated, etc., in the form of solutions in hydrocarbon solvents (for example, toluene). In other words, producing thin film coatings is a problem unless they are dissolved in hydrocarbon solvents. Moreover, the inventors herein noticed that if the thickness of films obtained by dissolving them in hydrocarbon solvents, applying the solution in the form of a thin film coating and volatilizing the solvent reaches 2 μm or more, cracks appear in the coating film, and, even if cracks do not appear at such time, cracking starts when the film is heat treated etc. in order to convert it to a silica coating. In addition, the inventors herein noticed that cast molding etc. is impossible and films, sheets, slabs, and blocks with a thickness in the millimeter order cannot be molded because the products, i.e. hydrogensiloxane copolymers, are solid at normal temperature and do not melt even when heated.

JP Kohyo 2000-510522 discloses a process for preparing hydridosiloxane resins or organohydridosiloxane resins comprising the steps of (a) contacting a silane monomer of the general formula $R^1SiX_3$ (where X is a halogen or $OR^2$, and $R^1$ and $R^2$ are independently selected from the group comprising H, alkyl, and aryl groups) with a phase transfer catalyst, i.e. a quaternary ammonium salt, in the presence of a reaction mixture comprising a nonpolar solvent and a polar solvent under conditions effective to catalytically convert said silane monomer into a hydridosiloxane resin or an organohydridosiloxane resin, and (b) recovering the hydridosiloxane resin or organohydridosiloxane resin produced above. The product is exemplified by resins represented by the formula $[H_{0.5\sim1.0}SiO_{1.5\sim1.8}]_p$ and by the formula $[HSiO_{1.5}]_n[SiO_2]_w$ (where p is an integer in the range of about 8 to about 5000, the sum of n and w is an integer in the range of about 8 to about 5000, and the sum of n and m is an integer in the range of about 8 to about 5000, . . . ), but only the product of hydrolysis/condensation of trichlorosilane (a hydrogensilsesquioxane resin) is mentioned in the Working Examples. Hydridosiloxane resins represented by the formula $[H_{0.5\sim1.0}SiO_{1.5\sim1.8}]_p$ and by the formula $[HSiO_{1.5}]_n[SiO_2]_w$ have a smaller ratio of H to Si than the hydrogensilsesquioxane resins, in other words, they are closer to silica $[SiO_2]$ and thus are more solid at normal temperature, harder to melt when heated, harder to dissolve in solvents, and are more difficult to use for thin film coatings.

JP Kokai 2001-2785 describes a process for producing a silicone resin comprising the steps of (A) subjecting at least one chlorosilane described by the formula $R_xSiCl_{4-x}$ (where X=0 or 1 and R=hydrogen or monovalent hydrocarbon group) to hydrolysis/condensation by adding it to a two-phase mixture comprising a nonpolar organic solvent and an aqueous phase containing a surface active compound selected from the group comprising 0 wt. % to 43 wt. % hydrochloric acid, alkylsulfonic acid hydrate, alkali metal salt of alkylsulfonic acid, arylsulfonic acid hydrate, and alkali metal salt of arylsulphonic acid, and (B) separating the two-phase mixture into an aqueous phase and an organic phase comprising the silicone resin and contacting said organic phase with a neutralizing agent; however, as far as pure hydrogenpolysiloxanes are concerned, only hydrogensilsesquioxane resins of the formula $(HSiO_{3/2})_m$ are described.

Incidentally, besides quartz glass, hydrogensilsesquioxane resins are the only polymeric materials possessing excellent transmittance in the vacuum UV region at 170 nm or higher to near infrared region up to 1700 nm. However, what the above-mentioned prior-art documents describe is nothing more than coating an extremely thin layer of a hydrogensilsesquioxane resin solution on a substrate, volatilizing the solvent, and then heating it to an elevated temperature to form a ceramic silica layer with a thickness of around 1 μm, but less than 2 μm. Accordingly, the processes of the above-mentioned prior-art documents are incapable of forming ceramic silica layers with a thickness of 2 μm or more on optical members made of quartz glass etc. They are, of course, even more inadequate for producing ceramic silica with a thickness in the millimeter order. Accordingly, they are unsuitable for producing optical elements that are required to possess inner structural uniformity and thickness permitting wide application in various UV light sources, primarily excimer lasers and the like.

SUMMARY OF THE INVENTION

The inventors herein arrived at the present invention as a result of in-depth investigations aimed at inventing dihydrogenpolysiloxanes; hydrogenpolysiloxanes; processes for their production; a process for producing silica type glass moldings of superior optical transmittance in the vacuum-UV region to UV region and in the visible region to near infrared region from the above-mentioned hydrogenpolysiloxanes; silica type glass moldings of superior optical transmittance in the vacuum-UV region to UV region and in the visible region to near infrared region; optical elements made up of such silica type glass; a process for producing optical elements having a film layer of silica type glass of superior optical transmittance in the vacuum-UV region to UV region and in the visible region to near infrared region provided on an optical member made of quartz etc., and optical elements having a film layer of silica type glass of superior optical transmittance in the vacuum-UV region to UV region and in the visible region to near infrared region provided on an optical member, which are free from the above-mentioned problems.

It is an object of the present invention to provide hydrogenpolysiloxanes that are liquid at normal temperature, allow for forming thin film coatings directly, without pretreatment, and exhibit no cracking even in case of coating films with a thickness of 2 μm or more;

an efficient process for their production;

hydrogenpolysiloxanes that make it possible, without pretreatment or upon dilution with a solvent, to form thin film coatings that have a thickness of 2 μm or more and exhibit no cracking;

a process for producing silica type glass moldings of superior optical transmittance in the vacuum-UV region to UV region and in the visible region to near infrared region from the above-mentioned hydrogenpolysiloxanes;

a silica type glass molding of superior optical transmittance in the vacuum-UV region to UV region and in the visible region to near infrared region;

an optical element comprising silica type glass of superior optical transmittance in the vacuum-UV region to UV region and in the visible region to near infrared region;

a process for producing optical elements having a film layer of silica type glass of superior optical transmittance in the vacuum-UV region to UV region and in the visible region to near infrared region provided on an optical member such as quartz etc., as well as to provide optical elements having a film layer of silica type glass of superior transmittance in the vacuum-UV region to UV region and in the visible region to near infrared region provided on an optical member made of quartz, etc.

The object is attained by providing:

[1] Cyclic dihydrogenpolysiloxanes, which have a weight-average molecular weight ranging in value from 1,500 to 1,000,000, are liquid at normal temperature, and comprise $H_2SiO_{2/2}$ units.

[2] A process for the production of cyclic dihydrogenpolysiloxanes which have a weight-average molecular weight ranging in value from 1,500 to 1,000,000, are liquid at normal temperature, and comprise $H_2SiO_{2/2}$ units, wherein dihydrogendichlorosilane is subjected to hydrolysis/condensation in a mixture of a non-polar organic solvent and water and volatile cyclic dihydrogenpolysiloxanes are removed from the formed dihydrogenpolysiloxanes.

[3] A process for the production of cyclic dihydrogenpolysiloxanes which have a weight-average molecular weight ranging in value from 1,500 to 1,000,000, are liquid at normal temperature, and comprise $H_2SiO_{2/2}$ units, wherein dihydrogendichlorosilane is subjected to hydrolysis/condensation in a mixture of a non-polar organic solvent, hydrochloric acid, and an ionic surface active agent, and volatile cyclic dihydrogenpolysiloxanes are removed from the formed dihydrogenpolysiloxanes.

[4] Hydrogenpolysiloxanes which have an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and x+y+z=1) and a weight-average molecular weight ranging in value from 500 to 1,000,000 and which are liquid at temperatures of not more than 120° C.

[5] A process for the production of hydrogenpolysiloxanes which have an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and x+y+z=1) and a weight-average molecular weight ranging in value from 500 to 1,000,000 and which are liquid at temperatures of less than 120° C., wherein (a) dihydrogendichlorosilane, (b) hydrogentrichlorosilane, and (c) tetraalkoxysilane or tetrachlorosilane are subjected to co-hydrolysis/condensation in mole ratios such that $0.12 \leq (a) < 1.0$, $0 \leq (b) \leq 0.88$, $0 \leq (c) \leq 0.30$, (b) and (c) are not simultaneously 0, and (a)+(b)+(c)=1 in a mixture of a non-polar organic solvent, hydrochloric acid, and an ionic surface active agent.

[6] The process for the production of hydrogenpolysiloxanes according to [5], wherein the non-polar organic solvent is toluene or xylene and the ionic surface active agent is selected from the group comprising aliphatic sulfonic acids, alkali metal salts of aliphatic sulfonic acids, alkylbenzenesulfonic acids, alkali metal salts of alkylbenzenesulfonic acids, and quaternary ammonium salts.

[7] A process for the production of hydrogenpolysiloxanes which are represented by the average siloxane unit formula $[H_2SiO_{2/2}]_v[HSiO_{3/2}]_w$ (where v and w represent mole fractions, $0.12 \leq v < 1.0$, $0 < w \leq 0.88$, and v+w=1.0), wherein dihydrogendichlorosilane is subjected to hydrolysis/condensation in a mixture of a non-polar organic solvent and water, and the formed dihydrogenpolysiloxanes are branched by mixing the non-polar organic solvent containing the formed dihydrogenpolysiloxanes, a protonic polar solvent and an inorganic acid.

[8] The process for the production of hydrogenpolysiloxanes according to [7], wherein the non-polar organic solvent is toluene or xylene, the inorganic acid is sulfuric acid, hydrochloric acid, nitric acid, or phosphoric acid, and the protonic polar solvent is an alcohol or an aliphatic carboxylic acid.

[9] A process for the production of silica type glass moldings with an optical transmittance of 90% to 100% in the vacuum-UV region at 170 nm or higher to UV region and an optical transmittance of 98% to 100% in the visible region to near infrared region up to 1700 nm, wherein (A) a cyclic dihydrogenpolysiloxane that has a weight-average molecular weight ranging in value from 1,500 to 1,000,000, is liquid at normal temperature, and comprises $H_2SiO_{2/2}$ units, or (B) a hydrogenpolysiloxane that has an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and x+y+z=1) and a weight-average molecular weight ranging in value from 500 to 1,000,000 and that is liquid at temperatures of less than 120° C., is placed into a mold and made more flowable, if necessary, by maintaining it at a temperature of less than 120° C. to avoid curing, whereupon the cyclic dihydrogenpolysiloxane (A) or hydrogenpolysiloxane (B) is cured to form silica type glass moldings, which is removed from the mold.

[10] The process for the production of silica type glass moldings according to [9], wherein means used for curing are heating at a temperature of not less than 150° C. under an oxygen gas-containing atmosphere, heating at a temperature of not less than 200° C. in an inert gas or vacuum, or irradiation with high-energy rays or exposure to high-energy irradiation.

[11] A silica type glass molding obtained as a cured product of the cyclic dihydrogenpolysiloxane (A) or as a cured product of hydrogenpolysiloxane (B) according to [9] and having an optical transmittance of 90% to 100% in the vacuum-UV region at 170 nm or higher to UV region and an optical transmittance of 98% to 100% in the visible region to near infrared region up to 1700 nm.

[12] An optical element comprising silica type glass obtained as a cured product of the cyclic dihydrogenpolysiloxane (A) or as a cured product of hydrogenpolysiloxane (B) according to [9] and having an optical transmittance of 90% to 100% in the vacuum-UV region at 170 nm or higher to UV region and an optical transmittance of 98% to 100% in the visible region to near infrared region up to 1700 nm.

[13] A process for the production of optical elements having a film layer of silica type glass with an optical transmittance of 90% to 100% in the vacuum-UV region at 170 nm or higher to UV region and an optical transmittance of 98% to 100% in the visible region to near infrared region up to 1700 nm, wherein (A) a cyclic dihydrogenpolysiloxane that has a weight-average molecular weight ranging in value from 1,500 to 1,000,000, is liquid at normal temperature, and comprises $H_2SiO_{2/2}$ units, or (B) a hydrogenpolysiloxane that has an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000 and that is liquid at temperatures of less than 120° C., is diluted with an organic solvent or made more flowable, if necessary, by maintaining it at a temperature of less than 120° C. to avoid curing, coated on an optical member with an optical transmittance of 90% to 100% in the vacuum-UV region to UV region and an optical transmittance of 98% to 100% in the visible region to near infrared region, and, if necessary, made solvent-free via volatilization of the organic solvent by maintaining it at a temperature of less than 120° C. to avoid curing, whereupon the cyclic dihydrogenpolysiloxane (A) or the hydrogenpolysiloxane (B) is cured.

[14] The process for the production of an optical element according to [13], wherein means used for curing include heating at a temperature of not less than 150° C. under an oxygen gas-containing atmosphere, heating at a temperature of not less than 200° C. in an inert gas or vacuum, irradiation with high-energy rays or exposure to high-energy irradiation, exposure to ozone, exposure to nitrous oxide, or exposure to wet ammonia.

[15] An optical element, wherein a silica type glass film layer obtained as a cured product of cyclic dihydrogenpolysiloxane (A) or as a cured product of hydrogenpolysiloxane (B) according to [13] and having an optical transmittance of 90% to 100% in the vacuum-UV region at 170 nm or higher to UV region and an optical transmittance of 98% to 100% in the visible region to near infrared region up to 1700 nm is provided on an optical member having an optical transmittance of 90% to 100% in the vacuum-UV region to UV region and an optical transmittance of 98% to 100% in the visible region to near infrared region.

Even without dissolution in organic solvents, the inventive cyclic dihydrogenpolysiloxanes can be used for making thin film coatings and are capable of forming silica type glass films of high hardness that exhibit no cracking when cured by heating at a temperature of 150° C. or higher under an oxygen gas-containing atmosphere, heating at a temperature of not less than 200° C. in an inert gas or vacuum, irradiation with high-energy rays or exposure to high-energy irradiation, exposure to ozone, exposure to nitrous oxide, or exposure to wet ammonia.

The inventive process for the production of cyclic dihydrogenpolysiloxanes makes it possible to obtain cyclic dihydrogenpolysiloxanes in a high yield because silicon-bonded hydrogen atoms are not eliminated in the production process. Even without dissolution in organic solvents, the inventive dihydrogenpolysiloxanes can be used for making thin film coatings and are capable of forming silica type glass films of high hardness that exhibit no cracking when cured by heating at a temperature of 150° C. or higher under an oxygen gas-containing atmosphere, etc.

When dissolved in organic solvents, the inventive hydrogenpolysiloxanes can be used for thin film coatings and are capable of forming silica type glass films of high hardness that exhibit no cracking when cured by heating at a temperature of 150° C. or higher under an oxygen gas-containing atmosphere, etc.

The inventive process for the production of silica type glass moldings makes it possible to easily produce cracking-free high-hardness silica type glass with an optical transmittance of 90% to 100% in the vacuum-UV region at 170 nm or higher to UV region and an optical transmittance of 98% to 100% in the visible region to near infrared region up to 1700 nm.

The inventive silica type glass molding possesses high hardness and appropriate elasticity while exhibiting no cracking.

The inventive process for the production of optical elements having a film layer of silica type glass with an optical transmittance of 90% to 100% in the vacuum-UV region at 170 nm or higher to UV region and an optical transmittance of 98% to 100% in the visible region to near infrared region up to 1700 nm allows for easily producing such optical elements.

The inventive optical elements of silica type glass have no detectable birefringence because they have no internal strain and possess appropriate elasticity and high hardness while exhibiting no cracking.

The inventive optical elements having a film layer of silica type glass with an optical transmittance of 90% to 100% in the vacuum-UV region at 170 nm or higher to UV region and an optical transmittance of 98% to 100% in the visible region to near infrared region up to 1700 nm have no observable birefringence because they have no internal strain, possess a high-hardness surface layer and exhibit no cracking.

Figure 1:
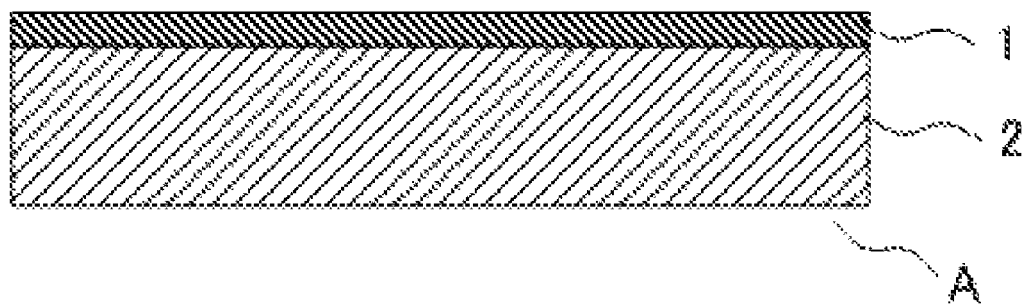
FIG. 1 is a sectional view of the synthetic quartz plate with silica type glass film in Working Example 1 of the present invention.

The reference numerals in the drawings are as follows;
1 silica type glass film
2 synthetic quartz plate
3 synthetic quartz plate

BEST MODE FOR CARRYING OUT THE INVENTION

The inventive cyclic dihydrogenpolysiloxanes, which have a weight-average molecular weight ranging in value from 1,500 to 1,000,000, are liquid at normal temperature, and comprise $H_2SiO_{2/2}$ units, can be used for thin film coatings even without dissolving them in organic solvents, produce coating films with a smooth surface and form cracking-free high-hardness silica type glass films when cured by heating under an oxygen gas-containing atmosphere etc., which makes them useful for producing silica type glass films, in particular, silica type glass films used for optical members. In addition, because they form cracking-free high-hardness silica type glass moldings when injected in a mold possessing mold-release properties and cured by heating etc. under an oxygen gas-containing atmosphere, they are useful in the production of silica type glass moldings, in particular, optical elements with an optical transmittance of 90% to 100% in the vacuum-UV region at 170 nm or higher to UV region and an optical transmittance of 98% to 100% in the visible region to near infrared region up to 1700 nm.

Because the lower limit of the weight-average molecular weight is 1,500, there is almost no volatilization of components in the process of curing, and, therefore, there is almost no shrinkage, which makes it possible to form silica type glass moldings of predetermined size.

From the standpoint of the ease of production and moldability, the upper limit of the weight-average molecular weight of such cyclic dihydrogenpolysiloxanes is preferably 100,000. Here, the weight-average molecular weight is obtained by preparing a 2 wt. % chloroform solution of a sample, performing measurements using gel permeation chromatography (GPC for short), and referencing the results to polystyrene standards of known weight-average molecular weight. It is desirable for the viscosity of the inventive cyclic dihydrogenpolysiloxanes at temperatures below the starting temperature of thermosetting, 120° C., to be not more than 10,000 mPa·s and particularly not more than 5,000 mPa·s. When silica type glass produced by curing is utilized for optical elements, it is often used to transmit coherent light, such as laser beam, and birefringence induced by internal strain becomes a factor modulating the laser beam, which is why it is necessary to make sure that no orientation or internal strain takes place. When their viscosity at temperatures lower than the starting temperature of thermosetting (120° C.) is not more than 10,000 mPa·s and particularly not more than 5,000 mPa·s, flow-induced orientation of the dihydrogenpolysiloxanes is unlikely to take place and such orientation can be easily alleviated even if it does occur temporarily.

The cyclic dihydrogenpolysiloxanes can be easily produced by subjecting dihydrogendichlorosilane ($H_2SiCl_2$) to hydrolysis/condensation in a mixture of a non-polar organic solvent and water, and removing volatile cyclic dihydrogenpolysiloxanes from the formed dihydrogenpolysiloxanes.

The non-polar organic solvents used herein are exemplified by aromatic hydrocarbon solvents and aliphatic hydrocarbon solvents, with the aromatic hydrocarbon solvents exemplified by toluene and xylene and the aliphatic hydrocarbon solvents exemplified by hexane, heptane, octane, and cyclohexane. It is preferred to conduct the hydrolysis/condensation reaction via slow dropwise addition of a non-polar organic solvent solution of the dihydrogendichlorosilane while stirring the non-polar organic solvent and water. It is preferred to conduct the dropwise addition at a temperature of not more than 5° C. in order to prevent volatilization of the dihydrogendichlorosilane.

It is preferred to conduct the hydrolysis/condensation of the dihydrogendichlorosilane in a mixture of a non-polar organic solvent phase and an aqueous phase, followed by washing the non-polar organic solvent phase containing the formed cyclic dihydrogenpolysiloxanes with water, drying it, and eluting the non-polar organic solvent and volatile cyclic dihydrogenpolysiloxanes.

Once the dropwise addition is complete, allowing the solution to stand causes it to separate into a non-polar organic solvent layer and an aqueous layer, after which the non-polar organic solvent layer is removed and washed with water. It is preferred to wash the layer until it becomes neutral or until chlorine ions are no longer detected. The layer may be also washed to a certain extent and neutralized with a weak alkali, e.g. calcium carbonate, sodium carbonate, or sodium bicarbonate, followed by washing the formed salts with water. The washed non-polar organic solvent layer is dried and the non-polar organic solvent and volatile cyclic dihydrogenpolysiloxanes are eluted. Although there are no particular limitations concerning the method used to dry the washed non-polar organic solvent layer so long as it does not alter the cyclic dihydrogenpolysiloxanes, it is preferable to add a powdered or granulated drying agent, e.g. anhydrous magnesium sulfate, anhydrous sodium sulfate, or a molecular sieve, subject the mixture to agitation and then filter off the drying agent.

There are no particular limitations concerning the elution of the non-polar organic solvent and cyclic dihydrogenpolysiloxane so long as the cyclic dihydrogenpolysiloxanes are not altered, which is exemplified by heating under reduced pressure or blowing in dry nitrogen gas under heating. The volatile cyclic dihydrogenpolysiloxanes mentioned herein are trimers to 15-mers. The fact that the product is cyclic dihydrogenpolysiloxanes is ascertained by the absence of silanol group absorption when analyzed using FT-IR.

The cyclic dihydrogenpolysiloxanes can be easily produced also by subjecting dihydrogendichlorosilane to hydrolysis/condensation in a mixture of a non-polar organic solvent, hydrochloric acid, and an ionic surface active agent, and removing volatile cyclic dihydrogenpolysiloxanes from the formed dihydrogenpolysiloxanes.

The inventive hydrogenpolysiloxanes, which have an average siloxane unit formula of $[H_2SiO_{2/2}]_x[HSiO_{3/2}]_y[SiO_{4/2}]_z$ (where x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000 and which are liquid at temperatures of 120° C. or less, can be used for making thin film coatings even without dissolution in organic solvents, produce coating films with a smooth surface and form cracking-free high-hardness silica type glass films when cured by heating under an oxygen gas-containing atmosphere etc., which makes them useful for producing silica type glass films, in particular, silica type glass films used for optical members that have no absorption in the vacuum-UV region to UV region. Additionally, they are useful for producing silica type glass moldings because they permit molding of cracking-free high-hardness silica type glass when injected in a mold possessing release properties and cured by heating etc. under an oxygen gas-containing atmosphere. They are particularly useful for producing optical elements exhibiting no absorption in the vacuum-UV region to UV region. From the standpoint of low shrinkage upon cure, the lower limit of the weight-average molecular weight of the dihydrogenpolysiloxanes is preferably 1,500, and from the standpoint of the ease of production and moldability, its upper limit is preferably 100,000. Here, the weight-average molecular weight was obtained by preparing a 2 wt. % chloroform solution of a sample, performing measurements using gel permeation chromatography (GPC for short), and referencing the results to polystyrene standards of known weight-average molecular weight.

It is desirable for the viscosity of the inventive hydrogenpolysiloxanes at temperatures lower than the starting temperature of thermosetting (120° C.) to be not more than 10,000 mPa·s. When silica type glass produced by curing is used for optical elements, it is often used to transmit coherent light, such as laser beam, and birefringence caused by internal strain becomes a factor modulating the laser beam, which is why it is necessary to make sure that no orientation or internal strain takes place. When their viscosity at temperatures lower than the starting temperature of thermosetting (120° C.) is not more than 10,000 mPa·s and particularly not more than 5,000 mPa·s, flow-induced orientation of the dihydrogenpolysiloxanes is unlikely to take place and such orientation can be easily alleviated even if it does occur temporarily.

When $z=0$ in the average siloxane unit formula $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$), the compound is represented by the average siloxane unit formula $[H_2SiO_{2/2}]_x[HSiO_{3/2}]_y$ (wherein x and y represent mole fractions, $0.12 \leq x < 1.0$, $0 \leq y \leq 0.88$, and $x+y=1$). Here, it is preferred that $0.15 \leq x<1.0$ and $0<y \leq 0.85$, because when x is small, the degree of branching increases and cracking becomes more likely to happen upon cure.

When y=0, the compound is represented by the average siloxane unit formula $[H_2SiO_{2/2}]_x[SiO_{4/2}]_z$ (wherein x and z represent mole fractions, $0.12 \leq x<1.0$, $0 \leq z<0.30$, and x+z=1). Here, it is preferred that $0.15 \leq x<1.0$ because when x is small, the degree of branching increases and cracking becomes more likely to happen upon cure, and it is preferred that $0<z \leq 0.15$ because when z is large, the degree of branching increases and cracking becomes more likely to happen upon cure.

The above-mentioned inventive hydrogenpolysiloxanes have the above-mentioned siloxane unit formulas in the molecule in mole fractions of x, y, and z on the average, which does not imply an arrangement in the order of the above-mentioned siloxane units. When siloxane units are arranged randomly in the molecule, there may be cases, in which some block portions are present, but the rest of the units are arranged in a random fashion. Since $[H_2SiO_{2/2}]$ units are always present, there may be linear blocks, but because there are always $[HSiO_{3/2}]$ units and/or $[SiO_{4/2}]$ units, the molecular structure is at least branched and may be network-like or cage-like as well, i.e. it could be a resin. When it has $[SiO_{4/2}]$ units, the degree of branching increases even more.

The above-mentioned inventive hydrogenpolysiloxanes are liquid at temperatures lower than the starting temperature of curing (120° C.), but it is desirable for their viscosity to be in the range of 1 to 10,000 mPa·s in order to facilitate the formation of thin film coatings. The larger the number of $[H_2SiO_{2/2}]$ units in the molecule, the more the compounds tend to be liquid at normal temperature and the more their viscosity decreases, and the larger the number of $[HSiO_{3/2}]$ units and the number of $[SiO_{4/2}]$ units in the molecule, the more their viscosity increases and the more likely they are to be solid at normal temperature, although at temperatures higher than normal temperature and lower than 120° C. they do not become solid. Because silicon-bonded hydrogen atoms in the hydrogenpolysiloxanes are not decomposed and eliminated below 120° C., the hydrogenpolysiloxanes can be heated and melted in the solid state.

The above-mentioned inventive hydrogenpolysiloxanes can be easily produced by a process wherein (a) dihydrogendichlorosilane ($H_2SiCl_2$), (b) hydrogentrichlorosilane (HSiCl$_3$), and (c) tetraalkoxysilane (Si(OR)$_4$) or tetrachlorosilane (SiCl$_4$) are subjected to co-hydrolysis/condensation in mole ratios such that $0.12 \leq (a)<1.0$, $0 \leq (b) \leq 0.88$, $0 \leq (c) \leq 0.30$, (a) and (b) are not simultaneously 0, and (a)+(b)+(c)=1 in a mixture of a non-polar organic solvent, hydrochloric acid, and an ionic surface active agent, whereupon the formed hydrogenpolysiloxane-containing non-polar organic solvent layer is washed with water, dried, and the non-polar organic solvent is eluted together with volatile hydrogenpolysiloxanes.

Here, R stands for an alkyl group, preferably ethyl, and can be a methyl or propyl group as well.

In addition, hydrogenpolysiloxanes of the average siloxane unit formula $[H_2SiO_{2/2}]_x[HSiO_{3/2}]_y$ (wherein x and y represent mole fractions, $0.12 \leq x<1.0$, $0<y \leq 0.88$, and x+y=1) can be produced via co-hydrolysis of (a) dihydrogendichlorosilane ($H_2SiCl_2$) and (b) hydrogentrichlorosilane (HSiCl$_3$), and hydrogenpolysiloxanes of the average siloxane unit formula $[H_2SiO_{2/2}]_x[SiO_{4/2}]_z$ (wherein x and z represent mole fractions, $0.12 \leq x<1.0$, $0<z \leq 0.30$, and x+z=1) can be produced via co-hydrolysis of (a) dihydrogendichlorosilane ($H_2SiCl_2$) and (c) tetraalkoxysilane (Si(OR)$_4$) or tetrachlorosilane (SiCl$_4$).

The hydrochloric acid is preferably concentrated hydrochloric acid, and, even more preferably, hydrochloric acid with a hydrogen chloride content of 15 wt. % to 37 wt. %. Because water contained in the hydrochloric acid is used for the hydrolysis of (a) dihydrogendichlorosilane ($H_2SiCl_2$), (b) hydrogentrichlorosilane (HSiCl$_3$), and (c) tetraalkoxysilane (Si(OR)$_4$) or tetrachlorosilane (SiCl$_4$), the hydrochloric acid is used in an amount that is equal to or higher than the equimolar amount necessary for the hydrolysis of (a) dihydrogendichlorosilane ($H_2SiCl_2$), (b) hydrogentrichlorosilane (HSiCl$_3$), and (c) tetraalkoxysilane (Si(OR)$_4$) or tetrachlorosilane (SiCl$_4$).

The ionic surface active agents suppress gelling due to rapid hydrolysis/condensation and independent condensation of hydrogentrichlorosilane, and promote its co-hydrolysis/condensation with dihydrogendichlorosilane. The ionic surface active agents include anionic surface active agents, cationic surface active agents, and amphoteric surface active agents, with the anionic surface active agents exemplified by alkali metal salts of aliphatic hydrocarbon sulfonic acids, e.g. alkali metal salts of alkylsulfonic acids of 6 to 20 carbon atoms, alkali metal salts of alkenesulfonic acids of 6 to 20 carbon atoms, and alkali metal salts of alkylbenzenesulfonic acids; aliphatic hydrocarbon sulfonic acids, e.g. alkylsulfonic acids of 6 to 20 carbon atoms, alkenesulfonic acids of 6 to 20 carbon atoms; alkylbenzenesulfonic acids; alkali metal salts of alkylsulfonic esters; and alkali metal salts of higher aliphatic acids. Sodium and potassium are preferred as the alkali metals used herein. The cationic surface active agents are exemplified by quaternary ammonium salts, e.g. tetramethylammonium chloride, benzyltributylammonium chloride, cetyltrimethylammonium chloride, and tetrabutylammonium chloride; and by alkylamine hydrochlorides, e.g. decylamine hydrochloride. The amount, in which the ionic surface active agents are used, is preferably 0.01 to 50 wt. %, and even more preferably, 0.1 to 1.0 wt. % of the water contained in the hydrochloric acid.

The hydrolysis/condensation reaction is carried out via dropwise addition of a non-polar organic solvent solution containing dihydrogendichlorosilane and hydrogentrichlorosilane or a non-polar organic solvent solution containing dihydrogendichlorosilane, hydrogentrichlorosilane, and tetraalkoxysilane or tetrachlorosilane to a mixture consisting of a non-polar organic solvent, hydrochloric acid, and an ionic surface active agent. It is preferred to continue agitation during the dropwise addition.

It is preferred to conduct the hydrolysis/condensation reaction at a temperature of not more than 5° C. in order to prevent volatilization of the dihydrogendichlorosiloxane, hydrogentrichlorosilane, tetraalkoxysilane or tetrachlorosilane.

The inventive hydrogenpolysiloxanes of the average siloxane unit formula $[H_2SiO_{2/2}]_v[HSiO_{3/2}]_w$ (where v and w represent mole fractions, $0.12 \leq v<1.0$, $0<w \leq 0.88$, and v+w=1.0) can be readily produced by subjecting dihydrogendichlorosilane to hydrolysis/condensation in a mixture of a non-polar organic solvent and water, and the formed dihydrogenpolysiloxanes are branched by mixing the non-polar organic solvent containing the formed dihydrogenpolysiloxanes, a protonic polar solvent and an inorganic acid. The inorganic acid used in the reaction is exemplified by sulfuric acid, hydrochloric acid, nitric acid, and phosphoric acid, with sulfuric acid being the most preferable acid among the above. The protonic polar solvent is exemplified by alcohols and aliphatic carboxylic acids, but because the target compound is less likely to be liquid at normal temperature when the number of carbon atoms is too large, alcohols of 10 carbon atoms or less and aliphatic carboxylic acids of 5 carbon atoms or less are preferred, with ethyl alcohol, methyl alcohol, propyl alcohol, acetic acid, and propionic acid being particularly preferable.

The reaction used for the hydrolysis/condensation of the dihydrogendichlorosilanes in a mixture of non-polar organic solvent and water is as described above. The mixing of the protonic polar solvent, inorganic acid, and non-polar organic solvent containing the formed dihydrogenpolysiloxane is preferably carried out at normal temperature for about 3 to 5 hours.

Once the reaction is complete, the non-polar organic solvent layer containing the formed dihydrogenpolysiloxane is removed, washed with water and dried, and the non-polar organic solvent and volatile hydrogenpolysiloxanes are eluted. The removal, washing, drying and elution of the non-polar organic solvent and volatile hydrogenpolysiloxanes are carried out as described above. It is better to perform the removal of the protonic polar solvent simultaneously with the elution of the non-polar organic solvent and volatile hydrogenpolysiloxanes.

When the inventive cyclic dihydrogenpolysiloxanes that have a weight-average molecular weight ranging in value from 1,500 to 1,000,000, are liquid at normal temperature, and comprise $H_2SiO_{2/2}$ units, as well as the hydrogenpolysiloxanes that have an average siloxane unit formula of $[H_2SiO_{2/2}]_x[HSiO_{3/2}]_y[SiO_{4/2}]_z$ (where x, y, and z represent mole fractions, $0.12 \leq x<1.0$, $0 \leq y<0.88$, $0 \leq z<0.30$, y and z are not simultaneously 0, and $x+y+z=1$) and a weight-average molecular weight ranging in value from 500 to 1,000,000 and which are liquid at temperatures of less than 120° C., are heated to a temperature of 150° C. or higher, silicon-bonded hydrogen atoms are turned into hydroxyl groups via an oxidation reaction and cross-linking takes place as a result of a dehydration condensation reaction with the silicon-bonded hydrogen atoms. In other words, cross-linking and curing take place as a result of forming Si—O—Si bonds. The reaction is also induced by ozone and occurs in a more efficient manner than when the reaction is induced by atmospheric oxygen. In wet ammonia, hydrogen atoms directly bonded to silicon become activated and turn into hydroxyl groups by readily reacting with moisture in the air, thereby causing a dehydration condensation reaction with silicon-bonded hydrogen atoms and cross-linking. As a result, silica (silicon oxide) is formed. However, there is no need to eliminate all hydrogen atoms directly bonded to silicon atoms in the molecules of the above-mentioned cyclic dihydrogenpolysiloxanes and the above-mentioned hydrogenpolysiloxanes and some of atoms, for instance, 60 mol % or less, may be left intact. The greater the extent, to which the silicon-bonded hydrogen atoms are expended, the higher the hardness of the silica type glass due to the formation of the Si—O—Si bonds, with its pencil hardness ranging from 2 to 10, and preferably, from 3 to 9. At such time, it is possible to use the above-mentioned cyclic dihydrogenpolysiloxanes and the above-mentioned hydrogenpolysiloxanes in combination.

Air is a representative example of the oxygen gas-containing atmosphere. It may be an oxygen gas-containing nitrogen gas or helium gas with an oxygen concentration lower than that of air. The heating temperature is preferably not less than 150° C., more preferably not less than 180° C. and, more preferably, 200 to 450° C. At 200° C., the heating time is preferably not less than 10 hours and may be shortened as the temperature is raised beyond that point. Heating at not less than 200° C. in inert gas or vacuum causes the re-distribution and cross-linking of the molecules, and curing. The heating temperature is preferably not less than 200° C. and, more preferably, 200 to 450° C. At 200° C., the heating time is preferably not less than 10 hours and may be shortened as the temperature is raised beyond that point.

In addition to heating under an oxygen gas-containing atmosphere, the above-mentioned cyclic dihydrogenpolysiloxanes (A) and the above-mentioned hydrogenpolysiloxanes (B) also cure on exposure to ozone, exposure to nitrous oxide, or exposure to wet ammonia. The ozone is exemplified by pure ozone, ozone-containing air, steam-containing ozone, and ozone-containing nitrogen gas, any of which can be used. The nitrous oxide is exemplified by pure nitrous oxide gas, nitrous oxide-containing air, and nitrous oxide-containing nitrogen gas, any of which can be used. The wet ammonia is exemplified by ammonia-containing air, ammonium hydroxide gas, and nitrogen gas containing ammonia and steam, any of which can be used. The exposure to ozone, exposure to nitrous oxide, or exposure to ammonia may be carried out under heating.

The above-mentioned cyclic dihydrogenpolysiloxanes (A) and hydrogenpolysiloxanes (B) are also cured by irradiation with high-energy rays or exposure to high-energy irradiation. Electron beams and X-rays are representative examples of such rays and irradiation. The amount of electron beam irradiation is preferably not less than 0.5 to 10 MGy.

Silica type glass moldings can be produced by filling a mold possessing release properties with a cyclic dihydrogenpolysiloxane that has a weight-average molecular weight ranging from 1,500 to 1,000,000, is liquid at normal temperature and comprises $H_2SiO_{2/2}$ units, or a hydrogenpolysiloxane that has an average siloxane unit formula of $[H_2SiO_{2/2}]_x[HSiO_{3/2}]_y[HSiO_{4/2}]_z$ (where x, y, and z represent mole fractions, $0.12 \leq x<1.0$, $0 \leq y \leq 0.88$, $0 \leq z \leq 0.30$, and $x+y+z=1$) and a weight-average molecular weight ranging from 500 to 1,000,000 and that is liquid at temperatures of less than 120° C., and making it more flowable, if necessary, by maintaining it at a temperature of less than 120° C. to avoid curing, followed by forming a silica type glass molding by curing it by heating at a temperature of not less than 150° C. under an oxygen gas-containing atmosphere or by irradiation with high-energy rays or exposure to high-energy irradiation and removing the molding from the mold. There are no particular limitations concerning the shape of the silica type glass moldings, which is exemplified by various types of film, slabs, sheets, triangular prisms, square prisms, cylinders, cubes, tubes, true spheres, ellipsoids, convex lens shapes, concave lens shapes, prismatic shapes, shapes used for encapsulating materials in UV light sources, and shapes used for glass enclosures of lamps. At such time, it is possible to use the above-mentioned cyclic dihydrogenpolysiloxanes and the above-mentioned hydrogenpolysiloxanes in combination.

Because they are liquid at normal temperature, the above-mentioned cyclic dihydrogenpolysiloxanes can be easily injected into molds, whereas the above-mentioned hydrogenpolysiloxanes may need to have their flowability enhanced, if necessary, by keeping them at a temperature of less than 120° C., at which they would not cure, because their viscosity grows as the mole fraction of the $[H_2SiO_{2/2}]$ units becomes smaller and the mole fractions of the $[HSiO_{3/2}]$ units and $[SiO_{4/2}]$ units become larger. The mold can be any metal, plastic or ceramic mold as long as it has mold release properties with respect to silica type glass. The inner shape of the mold may vary depending on the shape of the silica type glass molding, in particular, the shape of the optical element.

At such time, for complete mold transfer, it is important that the compound should be in close contact with the surface of the mold, which is why it is necessary to take into consideration post-curing thermal shrinkage, curing-induced shrinkage, and thermal expansion of the above-mentioned hydrogenpolysiloxanes or the above-mentioned cyclic dihydrogenpolysiloxanes prior to curing. When the above-mentioned cyclic dihydrogenpolysiloxanes or the above-mentioned hydrogenpolysiloxanes are injected or flowed into a mold at a temperature in the vicinity of room temperature and then heated to 120° C. or more, an expansion of several % occurs because the coefficient of linear expansion of the above-mentioned cyclic dihydrogenpolysiloxanes and the above-mentioned hydrogenpolysiloxanes is 100 to 150 ppm. On the other hand, since curing-induced shrinkage due to the condensation reaction is usually not less than 5%, thermal expansion-related volumetric changes and curing-induced shrinkage cannot cancel each other out. Accordingly, it is preferable to conduct curing under pressure. To obtain excellent optical characteristics, it is preferable to make sure no strain is generated in the process of curing. For this reason, it is desirable to use cyclic dihydrogenpolysiloxanes or hydrogenpolysiloxanes having a viscosity of not more than 10,000 mPa·s, and especially not more than 5,000 mPa·s, at temperatures below the starting temperature of thermosetting, i.e. 120° C.

Mold-based molding processes are exemplified by compression molding, extrusion molding, transfer molding, cast molding, and dip molding. Curing by heating is suitable for compression molding, cast molding, extrusion molding and transfer molding, and curing by irradiation with high-energy rays or exposure to high-energy irradiation is suitable for cast molding and dip molding.

The thus obtained silica type glass moldings are useful as material for optical elements because they are colorless and transparent, exhibit no cracking or internal strain, have a pencil hardness of 2 to 10 and appropriate elasticity, and possess an optical transmittance of 90% to 100% in the vacuum-UV region at 170 nm or higher to UV region, i.e. 170 to 400 nm, and an optical transmittance of 98% to 100% in the visible region to near infrared region up to 1700 nm, i.e. from 400 to 1700 nm. The thus obtained silica type glass moldings exhibit no birefringence, as measured by an ellipsometer, and their surface roughness, as measured by Atomic Force Microscopy (ATM), is not more than 12 nm, which makes it possible to achieve a precision of at leas about $\frac{1}{10}\lambda$ at 200 nm and excellent transfer of the inner surface shape of the mold used for molding. Furthermore, the moldings are useful as materials for optical elements exposed to elevated temperatures because they have a coefficient of linear expansion of about 120 ppm and possess durability at temperatures in the vicinity of 400° C. Lenses, mirrors, prisms, encapsulating members, diffraction gratings, and glass enclosures for lamps are representative of optical elements made of such silica type glass. The lenses are exemplified by convex lenses, concave lenses, diffraction lenses, light-diffusing lenses, and light beam condensing lenses. The light that passes through the optical elements is exemplified by vacuum-UV light or rays, far-UV light or rays, UV light or rays, excimer laser beam, solid-state laser beam, YAG laser beam, and visible light.

Optical elements having a film layer of colorless, transparent, cracking- and internal stress-free silica type glass with a pencil hardness of 2 to 10, an optical transmittance of 90% to 100% in the vacuum-UV region at 170 nm or higher to UV region and an optical transmittance of 98% to 100% in the visible region to near infrared region up to 1700 nm can be produced by a process, in which a cyclic dihydrogenpolysiloxane that has a weight-average molecular weight ranging from 1,500 to 1,000,000, is liquid at normal temperature, and comprises $H_2SiO_{2/2}$ units, or a hydrogenpolysiloxane that has an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, and $x+y+z=1$) and a weight-average molecular weight ranging from 500 to 1,000,000 and that is liquid at temperatures of less than 120° C. is made more flowable, if necessary, by maintaining it at a temperature of less than 120° C. to avoid curing, coated on an optical member with an optical transmittance of 90 to 100% in the vacuum-UV region to UV region and an optical transmittance of 98 to 100% in the visible region to near infrared region, and then cured, more specifically, cured by heating at a temperature of not less than 150° C. under an oxygen gas-containing atmosphere, heating at a temperature of not less than 200° C. in an inert gas or vacuum, by irradiation with high-energy rays or exposure to high-energy irradiation, by exposure to ozone, by exposure to nitrous oxide or by exposure to wet ammonia. At such time, it is possible to use the above-mentioned cyclic dihydrogenpolysiloxanes and the above-mentioned hydrogenpolysiloxanes in combination.

Optical members of synthetic quartz, natural quartz, and fluorite are representative examples of optical members with an optical transmittance of 90 to 100% in the vacuum-UV region to UV region and an optical transmittance of 98 to 100% in the visible region to near infrared region.

When the above-mentioned cyclic dihydrogenpolysiloxanes or the above-mentioned hydrogenpolysiloxanes are highly viscous or when the above-mentioned hydrogenpolysiloxanes are solid, it is preferable use them for coating after dilution with a solvent. In particular, dilution with solvents is preferred when forming silica type glass thin films with a film thickness on the order of 1 μm. The solvents are exemplified by toluene, xylene, benzene, and other aromatic hydrocarbons; cyclohexane, hexane, octane, decane, and other aliphatic hydrocarbons; dichloromethane, chloroform, and other halogen-containing hydrocarbons; methyl ethyl ketone, methyl isobutyl ketone, and other aliphatic ketones; butyl ether, tetrahydrofuran, and other ethers.

The concentration of the above-mentioned cyclic dihydrogenpolysiloxanes and the above-mentioned hydrogenpolysiloxanes in the solvents should be sufficient to form thin films of silica type glass with a film thickness on the order of 1 μm by lowering their viscosity or dissolving them, i.e., for instance, 10 to 60 wt. %, and, more preferably, 10 to 50 wt. %.

There are no particular limitations concerning the method of coating, which is exemplified by spin coating, blade coating, spraying, roller coating, and dip coating. The thickness of the silica type glass films may vary from 1 μm to 10 μm and up to about 1 mm.

The thus obtained optical members with a layer of silica type glass are useful as optical elements because they exhibit no cracking or internal strain, have a pencil hardness prescribed in 8.4.2 of JIS K5400 of 2 to 10, and possess an optical transmittance of 90% to 100% in the vacuum-UV region at 170 nm or higher to UV region, i.e. 170 to 400 nm, and an optical transmittance of 98% to 100% in the visible region to near infrared region up to 1700 nm, i.e. 400 to 1700 nm. Additionally, while the thus obtained optical elements having a silica type glass layer have some limitations with regard to sputtering film-forming substances used for antireflective films due to the presence of reducing properties, the antireflective films can be formed in the same manner as the glass. Furthermore, the moldings are useful as materials for optical elements exposed to elevated temperatures because they have a coefficient of linear expansion of about 120 ppm and possess durability at temperatures in the vicinity of 400° C. Lenses, mirrors, prisms, diffraction gratings, encapsulating members, and glass enclosures for lamps are representative of the thus obtained optical elements having a silica type glass film layer, which are cracking- and internal strain-free, have a pencil hardness of 2 to 10, and possess an optical transmittance of 90% to 100% in the vacuum-UV region at 170 nm or higher to UV region and an optical transmittance of 98% to 100% in the visible region to near infrared region up to 1700 nm. The lenses are exemplified by convex lenses, concave lenses, diffraction lenses, light-diffusing lenses, and light beam condensing lenses. The light that passes through the optical elements is exemplified by vacuum-UV rays of 170 nm or higher, far-UV rays, UV rays, excimer laser beam, solid-state laser beam, YAG laser beam, visible light, and near infrared light of up to 1700 nm.

EXAMPLES

In the Working Examples and Comparative Examples, procedures such as dissolving, stirring, coating, and heating were conducted in a laboratory atmosphere unless conditions are specifically explained. Various characteristics were measured under the following conditions.

The viscosity of the cyclic dihydrogenpolysiloxanes and hydrogenpolysiloxanes was measured at 25° C. using an E-type rotational viscometer available from TOKIMEC Co.

The molecular weight distribution and weight-average molecular weight of the cyclic dihydrogenpolysiloxanes and hydrogenpolysiloxane resins were measured by means of gel permeation (GPC). The GPC system included a refraction detector and two "TSKgel GMH$_{XL}$-L" columns from Tosoh Corporation attached to a Tosoh HLC-8020 Gel Permeation (GPC) system from Tosoh Corporation.

Samples were subjected to measurements in a 2-wt. % chloroform solution. Calibration curves were prepared using standard polystyrene of known weight-average molecular weight. The weight-average molecular weight was obtained by referencing to the standard polystyrene.

The $^{29}$Si-NMR and $^{1}$H-NMR of the cyclic dihydrogenpolysiloxanes and hydrogenpolysiloxanes were measured using the Bruker ACP-300 Spectrometer. FT-IR spectra of the cyclic dihydrogenpolysiloxanes and hydrogenpolysiloxanes were recorded on a Nicolet Protégé 460 spectrometer.

The residual percentage of silicon atoms-bonded hydrogen atoms was calculated by the height of the absorption bands at 2250 cm$^{-1}$ and 2190 cm$^{-1}$ with calibration by film thickness.

The detection of silanol groups was performed by monitoring absorption peaks at around 3600 cm$^{-1}$ to 3300 cm$^{-1}$.

The pencil hardness of the cured product, i.e. silica type glass, was the highest pencil hardness that did not result in scratches during a test, in which pencils of various hardness were run across the surface in accordance with JIS K5400.

Cracking of the cured product, i.e. silica type glass, was examined using an electron microscope, the KEYENCE VH-7000.

The spectral transmittance of the cured product, i.e. silica type glass, was measured on the UV3100P, a spectrophotometer available from Shimadzu Corporation, using synthetic quartz as a reference.

Working Example 1

Preparation of Cyclic Dihydrogenpolysiloxanes

After cooling a 4-neck glass flask equipped with a stirrer, a temperature gauge, a nitrogen gas inlet, and a dropping funnel to below −5° C. using dry ice and isopropanol, 100 ml toluene and 30 ml distilled water were added to the flask while passing nitrogen gas therethrough, and a mixture of 10 ml dihydrogendichlorosilane and 10 ml toluene was added dropwise under agitation at a sub-zero temperature over a period of 30 hours. After stirring the reaction mixture for another 30 minutes, the reaction temperature was slowly raised and returned to room temperature. After stirring for another 30 minutes at room temperature, the toluene layer was separated, washed with saturated saline, and then dried by adding anhydrous sodium sulfate powder, after which the anhydrous sodium sulfate powder was filtered off to yield a transparent toluene solution. The toluene solution was subjected to stripping under a reduced pressure of 1.0×10$^{-2}$ mmHg to elute the toluene and volatile cyclic dihydrogenpolysiloxanes, yielding a colorless transparent liquid. When the molecular weight of the liquid, referenced to styrene, was measured by means of GPC using a chloroform solvent, its weight-average molecular weight was found to be 5.0×10$^{5}$. The viscosity of the liquid was 800 mPa·s. For this liquid, only a −49.05 ppm signal derived from H$_2$SiO$_{2/2}$ units was observed by $^{29}$Si-NMR and only a 4.77 ppm signal derived from H$_2$SiO$_{2/2}$ units was observed by $^{1}$H-NMR. In addition, absorption peaks indicating silanol groups and other polysiloxane terminals were not observed during FT-IR measurements. The results of the measurements indicate that the product of hydrolysis/condensation was cyclic dihydrogenpolysiloxanes.

Working Example 2

Preparation of Cyclic Dihydrogenpolysiloxanes 100 ml toluene and 50 ml concentrated hydrochloric acid were added to a 4-neck glass flask equipped with a stirrer, a temperature gauge, a nitrogen gas inlet, and a dropping funnel, the mixture was stirred in the flask at 5° C. to −5° C. while passing nitrogen gas therethrough, and a mixture of 10 ml dihydrogendichlorosilane and 10 ml toluene cooled to below 5° C. with dry ice and isopropanol was added dropwise under agitation over a period of 30 hours. After stirring the reaction mixture for another 30 minutes, the reaction temperature was slowly raised and returned to room temperature. After stirring for another 30 minutes at room temperature, the toluene layer was separated, washed with saturated saline, and then dried by adding anhydrous sodium sulfate powder, after which the anhydrous sodium sulfate powder was filtered off to yield a transparent toluene solution. The toluene solution was subjected to stripping under a reduced pressure of 1.0×10$^{-2}$ mmHg to elute the toluene and volatile cyclic dihydrogenpolysiloxanes, yielding a colorless transparent liquid. When the molecular weight of the liquid, referenced to styrene, was measured by means of GPC using a chloroform solvent, its weight-average molecular weight was found to be 5.0×10$^{5}$. The viscosity of the liquid was 800 mPa·s. For this liquid, only a −49.05 ppm signal derived from H$_2$SiO$_{2/2}$ units was observed by $^{29}$Si-NMR and only a 4.77 ppm signal derived from H$_2$SiO$_{3/2}$ units was observed by $^{1}$H-NMR. In addition, absorption peaks indicating silanol groups and other polysiloxane terminals were not observed during FT-IR measurements. The results of the measurements indicate that the product of hydrolysis/condensation was cyclic dihydrogenpolysiloxanes.

Working Example 3

Preparation of Hydrogenpolysiloxane Resins A to D 1 g sodium octylsulfonate, 200 ml concentrated hydrochloric acid and 700 ml toluene were placed in a 4-neck glass flask equipped with a stirrer, a temperature gauge, a nitrogen gas inlet, and a dropping funnel, and 200 ml of a mixed toluene solution of dihydrogendichlorosilane and hydrogentrichlorosilane (wherein the mole ratio of dihydrogendichlorosilane to hydrogentrichlorosilane was 12:98 (A), 15:85 (B), 25:75 (C), and 50:50 (D)) cooled to below 5° C. with dry ice and isopropanol was added in a dropwise manner through the dropping funnel over a period of 60 minutes under agitation at −5° C. while passing nitrogen gas therethrough. Once the dropwise addition was complete, the mixture was slowly returned to room temperature and stirred for another hour at room temperature, whereupon the organic layer was removed using a separation funnel, washed until neutral, and then dried by adding anhydrous magnesium sulfate powder. The anhydrous magnesium sulfate powder was filtered off, the toluene was removed using a rotary evaporator, and the residues were dried under vacuum. The dried residues (hydrogenpolysiloxane resin), which were colorless transparent liquids, were obtained in a yield of 80 to 90%, with their molecular weight distribution exhibiting a plurality of peaks. Siloxane unit formulas obtained based on the weight-average molecular weight (Mw), viscosity (mPa·s), and the average siloxane unit formula obtained based on integral values of −50.1 ppm signals derived from $H_2SiO_{2/2}$ units and −84.5 ppm signals derived from $HSiO_{3/2}$ units using $^{29}$Si-NMR or integral values of 4.71 ppm signals derived from $H_2SiO_{2/2}$ units and 4.37 ppm signals derived from $HSiO_{3/2}$ units using $^1$H-NMR are listed in Table 1.

TABLE 1

| Resin | Siloxane Unit Formula | Mw | Viscosity |
|---|---|---|---|
| A | $(H_2SiO_{2/2})_{0.12}(HSiO_{3/2})_{0.88}$ | $16.0 \times 10^3$ | 55,000 |
| B | $(H_2SiO_{2/2})_{0.15}(HSiO_{3/2})_{0.85}$ | $12.0 \times 10^3$ | 30,000 |
| C | $(H_2SiO_{2/2})_{0.25}(HSiO_{3/2})_{0.75}$ | $6.0 \times 10^3$ | 8,000 |
| D | $(H_2SiO_{2/2})_{0.50}(HSiO_{3/2})_{0.50}$ | $2.0 \times 10^3$ | 1,000 |

Working Example 4

Preparation of Hydrogenpolysiloxane Resin E 1 g tetrabutylammonium chloride, 100 ml concentrated hydrochloric acid and 400 ml toluene containing were placed in 4-neck glass flask equipped with a stirrer, a temperature gauge, a nitrogen inlet, and a dropping funnel, and a mixture of 10 ml dihydrogendichlorosilane, 50 ml hydrogentrichlorosilane (wherein the mole ratio of the dihydrogendichlorosilane to the hydrogentrichlorosilane was 1:4), and 50 ml toluene cooled to below 5° C. with dry ice and isopropanol was added in a dropwise manner through the dropping funnel over a period of 60 minutes under agitation at −5° C. while passing nitrogen gas therethrough. Once the dropwise addition was complete, the mixture was slowly returned to room temperature and stirred for another one hour at room temperature, whereupon the organic layer was removed using a separation funnel, washed with water until neutral, and then dried by adding anhydrous magnesium sulfate powder. The anhydrous magnesium sulfate powder was filtered off, the toluene was removed using a rotary evaporator under heating and reduced pressure, and the residue was dried under vacuum. The dried residue (hydrogenpolysiloxane resin E), which was a colorless transparent liquid, was obtained in a yield of 40% and its molecular weight distribution exhibited a plurality of peaks. Its viscosity was 7,000 mPa·s, its weight-average molecular weight (Mw) was $5.0 \times 10^3$, and its average siloxane unit formula obtained based on integral values of −50.1 ppm signals derived from $H_2SiO_{2/2}$ units and −84.5 ppm signals derived from $HSiO_{3/2}$ units using $^{29}$Si-NMR or integral values of 4.71 ppm signals derived from $H_2SiO_{2/2}$ units and 4.37 ppm signals derived from $HSiO_{3/2}$ units using $^1$H-NMR was found to be $(H_2SiO_{2/2})_{0.20}(HSiO_{3/2})_{0.80}$.

Working Example 5

Preparation of Hydrogenpolysiloxane Resin F 1.0 g sodium octylsulfonate, 200 ml concentrated hydrochloric acid and 200 ml toluene were placed in a 4-neck glass flask equipped with a stirrer, a temperature gauge, a nitrogen gas inlet, and a dropping funnel, and a mixture of 4.7 g dihydrogendichlorosilane, 14.2 g hydrogentrichlorosilane, and 3.2 g tetraethoxysilane (wherein the mole ratio of the dihydrogendichlorosilane, hydrogentrichlorosilane, and tetraethoxysilane=0.28:0.62:0.10) cooled to below 5° C. with dry ice and isopropanol was added in a dropwise manner through the dropping funnel over a period of 60 minutes under agitation at 5° C. to −5° C. while passing nitrogen gas therethrough. Once the dropwise addition was complete, the mixture was slowly returned to room temperature and stirred for another one hour at room temperature, whereupon the organic layer was removed using a separation funnel, washed until neutral, and then dried by adding anhydrous magnesium sulfate powder. The anhydrous magnesium sulfate powder was filtered off, the toluene was removed using a rotary evaporator under heating and reduced pressure, and the residue was dried under vacuum. The dried residue (hydrogenpolysiloxane resin F), which was a colorless transparent liquid, was obtained in a yield of 65%, with its molecular weight distribution exhibiting a plurality of peaks. Its viscosity was 25,000 mPa·s, its weight-average molecular weight (Mw) was $27.5 \times 10^3$, and its average siloxane unit formula obtained based on integral values of −50.1 ppm signals derived from $H_2SiO_{2/2}$ units, −84.5 ppm signals derived from $HSiO_{3/2}$ units, and −112.4 ppm signals derived from $SiO_{4/2}$ units using $^{29}$Si-NMR, or integral values of 4.71 ppm signals derived from $HSiO_{3/2}$ units and 4.37 ppm signals derived from $HSiO_{3/2}$ units using $^1$H-NMR was found to be $(H_2SiO_{2/2})_{0.28}(HSiO_{3/2})_{0.62}(SiO_{4/2})_{0.10}$.

Working Example 6

Preparation of Hydrogenpolysiloxane Resin G 1.0 g sodium octylsulfonate, 200 ml concentrated hydrochloric acid and 200 ml toluene were placed in a 4-neck glass flask equipped with a stirrer, a temperature gauge, a nitrogen gas inlet, and a dropping funnel, and a mixture of 4.8 g dihydrogendichlorosilane, 14.2 g hydrogentrichlorosilane, and 1.6 g tetraethoxysilane (wherein the mole ratio of the dihydrogendichlorosilane, hydrogentrichlorosilane, and tetraethoxysilane=0.3:0.65:0.05) cooled to below 5° C. with dry ice and isopropanol was added in a dropwise manner through the dropping funnel over a period of 60 minutes under agitation at 5° C. to −5° C. while passing nitrogen gas therethrough. Once the dropwise addition was complete, the mixture was slowly returned to room temperature and stirred for another hour at room temperature, whereupon the toluene layer was removed using a separation funnel, washed with water until neutral, and then dried by adding anhydrous magnesium sulfate powder. The anhydrous magnesium sulfate powder was filtered off, the toluene was removed using a rotary evaporator under heating and reduced pressure, and the residue was dried under vacuum. The dried residue (hydrogenpolysiloxane resin G), which was a colorless transparent liquid, was obtained in a yield of 70%, with its molecular weight distribution exhibiting a plurality of peaks. It was found that the viscosity of the liquid was 1,500 mPa·s, its weight-average molecular weight (Mw) was $5.5\times10^3$, and its average siloxane unit formula obtained based on integral values of −50.1 ppm signals derived from $H_2SiO_{2/2}$ units, −84.5 ppm signals derived from $HSiO_{3/2}$ units, and −112.4 ppm signals derived from $SiO_{4/2}$ units using $^{29}$Si-NMR, was found to be $(H_2SiO_{2/2})_{0.30}(HSiO_{3/2})_{0.65}(SiO_{4/2})_{0.05}$.

Working Example 7

Preparation of Hydrogenpolysiloxane Resin H 200 ml toluene and 25 g dihydrogendichlorosilane were added to a 4-neck glass flask equipped with a stirrer, a temperature gauge, a nitrogen gas inlet, and a dropping funnel, the mixture was cooled to below −20° C., and 5 ml water was added thereto in a dropwise manner through the dropping funnel over a period of 30 minutes under agitation. Once the dropwise addition was complete, the reaction mixture was stirred for 1 hour at −20° C., returned to room temperature, and then stirred for another one hour. The toluene layer was removed using the separation funnel, combined with 100 ml concentrated sulfuric acid (concentration: 47 wt. %) and 50 ml acetic acid, and stirred for 5 hours at room temperature, whereupon the toluene layer was removed using the separation funnel, washed with water until neutral, and then dried by adding anhydrous magnesium sulfate powder. The anhydrous magnesium sulfate powder was filtered off, the toluene was removed using a rotary evaporator under heating and reduced pressure, and the residue was dried under vacuum. The dried residue (hydrogenpolysiloxane resin H), which was a colorless transparent liquid, was obtained in a yield of 80%, with its molecular weight distribution exhibiting a plurality of peaks. It was found that the viscosity of the liquid was 2000 mPa·s, its weight-average molecular weight (Mw) $5.2\times10^3$, and its average siloxane unit formula obtained based on integral values of −50.1 ppm signals derived from $H_2SiO_{2/2}$ units and −84.5 ppm signals derived from $HSiO_{3/2}$ units using $^{29}$Si-NMR, was found to be $(H_2SiO_{2/2})_{0.33}(HSiO_{3/2})_{0.67}$.

Working Example 8

A silica type glass film with a thickness of 3 μm was formed on a quartz plate by spin coating a flat quartz plate with the liquid cyclic dihydrogenpolysiloxane prepared in Working Example 1 and heating it at 200° C. for 15 hours. The quartz plate, on which the silica type glass film was formed, had an optical transmittance of 90% at a wavelength of 200 nm and that of 99% at 400 nm. In the visible region to near infrared region up to 1700 nm, it exhibited absolutely no absorption and had an optical transmittance of 99%. The pencil hardness of the silica type glass film was 4H. No cracking was observed in the silica type glass film.

Working Example 9

Liquid hydrogenpolysiloxane resin D prepared in Working Example 3 was spin coated on a flat quartz plate at 2000 rpm and cured by heating at 200° C. for 9 hours, thereby forming a silica type glass film. The quartz plate, on which the silica type glass film was formed, had an optical transmittance of 90% at a wavelength of 190 nm and that of 99% at 400 nm. In the visible region, it exhibited absolutely no absorption and had a spectral transmittance of 99%. Its film thickness, which was measured using Film Thickness Measurement System F20 available from Filmetrics, Inc. (US), was 5 μm. The silica type glass film exhibited excellent adhesion to the quartz plate. The pencil hardness of the silica type glass film was measured and found to be 4H. No cracking was observed in the silica type glass film.

Working Example 10

A silica type glass film with a thickness of 10 μm was formed on a quartz plate by blade coating a flat quartz plate with liquid hydrogenpolysiloxane resin C prepared in Working Example 3 and heating it at 200° C. for 15 hours. The quartz plate, on which the silica type glass film was formed, had an optical transmittance of 90% at a wavelength of 190 nm and that of 99% at 400 nm. In the visible region to near infrared region up to 1700 nm, it exhibited absolutely no absorption and had an optical transmittance of 99%. The pencil hardness of the silica type glass film was 4H. No cracking was observed in the silica type glass film.

Working Example 11

A mold form of polytetrafluoroethylene with a thickness of 2 mm was placed on a piece of polyethylene terephthalate film and liquid hydrogenpolysiloxane resin A prepared in Working Example 3 was poured into the mold, which was then placed in a 30 cm (width)×30 cm (length) bag of polyethylene film filled with air containing 5 vol % ammonia gas and allowed to stand for 1 hour to cure the liquid hydrogenpolysiloxane resin A. When the cured product, i.e. a silica type glass plate with a thickness of 2 mm, was peeled off from the polyethylene terephthalate film and mold form, measurements revealed that it had a spectral transmittance of 95% at 200 nm and that of 99% at 400 nm. The pencil hardness of the silica type glass plate was 4H, with no cracking observed.

Working Example 12

A disk-shaped colorless transparent semi-cured product with a thickness of 4 mm was obtained by placing liquid hydrogenpolysiloxane resin B prepared in Working Example 3 in a 50-ml polytetrafluoroethylene cup and heating it for 2 hours in an oven at 150° C. under a reduced pressure. After heating the semi-cured product for 2 hours at 200° C., the temperature was increased to 250° C. over a period of 4 hours and heating was continued for another 8 hours under a reduced pressure of 0.1 mmHg, whereupon the product was cooled over a period of 6 hours, obtaining a disk-shaped colorless transparent silica type glass molding with a thickness of 4 mm. Measurements of the optical transmittance of the semi-cured product and silica type glass molding, which were conducted in the same manner as in Working Example 8, revealed that the spectral transmittance at a wavelength of 200 nm was 90% for the semi-cured product and 92% for the silica type glass molding. Both the semi-cured product and silica type glass molding had a spectral transmittance of 99% at a wavelength of 400 nm. The pencil hardness of the silica type glass molding was 4H.

Working Example 13

A silica type glass film with a thickness of 7.5 μm was formed by spin coating a flat quartz plate with liquid hydrogenpolysiloxane resin C prepared in Working Example 3 at 2000 rpm and curing it via irradiation with a 3 MGy dose of electron beam radiation. The quartz plate, on which the silica type glass film was formed, had an optical transmittance of 92% at a wavelength of 190 nm and that of 99% at 400 nm. In the visible region to near infrared region up to 1700 nm, it exhibited absolutely no absorption and had an optical transmittance of 99%.

The silica type glass film exhibited excellent adhesion to the quartz plate, with no cracking observed. The pencil hardness of the silica type glass film was 9H. Based on the decrease in the height of the 2200 cm$^{-1}$ absorption peak derived from O$_{1.5}$SiH and the 2264 cm$^{-1}$ peak derived from OSiH$_2$, i.e. the characteristic absorption of silicon-bonded hydrogen atoms (SiH) in infrared absorption spectra, it was determined that the content of SiH had been decreased by 60%.

Working Example 14

After preparing a methyl isobutyl ketone solution (concentration: 30 wt. %) of liquid hydrogenpolysiloxane resin B prepared in Working Example 3 and coating it on a quartz plate, the plate was heated at 200° C. for 15 hours, thereby forming a silica type glass film with a thickness of 2 μm on the quartz plate. The quartz plate, on which the silica type glass film was formed, had an optical transmittance of 95% at a wavelength of 200 nm and that of 99% at 400 nm. In the visible region to near infrared region up to 1700 nm, it exhibited absolutely no absorption and had an optical transmittance of 99%. The pencil hardness of the silica type glass film was 4H, with no cracking observed in the silica type glass film. After heating the quartz plate coated with the silica type glass film in a muffle furnace at 200° C. for 1 hour, the temperature was raised to 400° C. over a period of 2 hours and heating continued for 1 hour at this temperature, whereupon the plate was slowly cooled over a period of 6 hours. When the optical transmittance of the quartz plate coated with the silica type glass film was measured in the same manner as above after the heat treatment, it was found that there had been no change in absorption and the plate had maintained excellent optical transmittance. The pencil hardness of the silica type glass film was 9H.

Comparative Example 1

Hydrogentriethoxysilane and ethanol were added to a 4-neck glass flask equipped with a stirrer, a temperature gauge, a nitrogen gas inlet, and a dropping funnel, the mixture was cooled in ice water, and 3 times as much water as the amount of hydrogentriethoxysilane was slowly added thereto in a dropwise manner through the dropping funnel under agitation. Once the dropwise addition was complete, the mixture was stirred at room temperature, whereupon the precipitate was filtered off, ethanol was removed, and the product was dried under vacuum. Next, its molecular weight referenced to polystyrene standards was obtained by GPC measurements using toluene as the solvent. In this manner, a hydrogenpolysilsesquioxane resin with a weight-average molecular weight of 5,300 was obtained.

The hydrogenpolysilsesquioxane resin was dissolved in methyl isobutyl ketone dehydrated using a molecular sieve in such a manner that the concentration of the resin reached 30 wt. %. A 5 μm coating film on a quartz plate, which was fabricated by blade-coating a quartz plate with the solution and allowing it to dry, exhibited cracking. A 2 μm coating film, which was fabricated by spin coating a quartz plate with the solution and allowing it to dry, also exhibited cracking.

Comparative Example 2

750 ml (656 g) benzene, 90 ml (166 g) of 95 to 96% sulfuric acid, and 80 ml (147 g) fuming sulfuric acid (15% SO$_3$) were added to a 4-neck glass flask equipped with a stirrer, a temperature gauge, a nitrogen gas inlet, and a dropping funnel. 200 ml (175 g) benzene, 7.0 ml (9.4 g) hydrogentrichlorosilane, and 7.0 ml (8.5 g) dihydrogendichlorosilane were placed in the dropping funnel and added in a dropwise manner to the rapidly stirred 4-neck glass flask over a period of 5 hours. Once the dropwise addition was complete, the mixture was stirred for another 30 minutes. The resulting mixture was placed in a separation funnel, the acidic aqueous layer was discarded, and the benzene layer was washed 5 times with mixtures of sulfuric acid and water (5:1, 2:1, 1:1, 1:2, and 1:5 respectively). The layer was then washed 5 times with distilled water, filtered and the benzene in the filtrate was allowed to evaporate. The resulting white solid copolymer, which was obtained in the amount of 4.42 g (yield: 58%), was found to be soluble in toluene. Based on the integral values of −50.1 ppm signals derived from H$_2$SiO$_{2/2}$ units and −84.5 ppm signals derived from HSiO$_{3/2}$ units using $^{29}$Si-NMR or integral values of 4.71 ppm signals derived from H$_2$SiO$_{2/2}$ units and 4.37 ppm signals derived from HSiO$_{3/2}$ units using $^1$H-NMR, it was found that it was a hydrogenpolysiloxane resin described by the average siloxane unit formula of (H$_2$SiO$_{2/2}$)$_{0.05}$(HSiO$_{3/2}$)$_{0.95}$. The resin was dissolved in methyl isobutyl ketone that had been dehydrated using a molecular sieve in such a manner that the concentration of the resin reached 30 wt. %. When a 4 μm coating film on a quartz plate, which had been fabricated by blade-coating a quartz plate with the solution and allowing it to dry, was heated at 200° C. for 2 hours, the film exhibited cracking. When placed in a 30 cm×30 cm polyethylene bag filled with air containing 5 vol % ammonia for 1 hour and allowed to cure, the film also exhibited cracking.

INDUSTRIAL APPLICABILITY

The inventive cyclic dihydrogenpolysiloxanes, which have a weight-average molecular weight ranging in value from 1,500 to 1,000,000, are liquid at normal temperature, and comprise H$_2$SiO$_{2/2}$ units, as well as the inventive hydrogenpolysiloxanes, which have an average siloxane unit formula of [H$_2$SiO$_{2/2}$]$_x$[HSiO$_{3/2}$]$_y$[SiO$_{4/2}$]$_z$ (wherein x, y, and z represent mole fractions, $0.12 \leq x < 1.0$, $0 \leq y \leq 0.88$, $0 \leq z \leq 0.30$, and x+y+z=1) and a weight-average molecular weight ranging in value from 1,500 to 1,000,000 and which are liquid at temperatures of less than 120° C., are useful as materials for optical elements because they form high-hardness silica type glass that does not exhibit cracking upon cure and because the silica type glass has excellent optical transmittance in a wide wavelength range spanning from the vacuum-UV region at 170 nm to the UV region and from the visible region to the near infrared region up to 1700 nm.

The inventive processes for the production of cyclic dihydrogenpolysiloxanes (A) and hydrogenpolysiloxanes (B) are useful for producing them effectively and with high productivity.

The inventive silica type glass type moldings and optical elements are useful for optical elements for devices furnished with UV light sources such as UV lamps, excimer lasers, UV LEDs, and LED utilizing semiconductor nanoparticles; optical elements for laser devices such as frequency quadrupled (266 nm) solid-state lasers and YAG lasers; and optical waveguides.

The inventive process for the production of silica type glass type moldings and optical elements are useful for producing them precisely, efficiently and with high productivity.

The invention claimed is:

1. A cyclic dihydrogenpolysiloxane having a weight-average molecular weight ranging in value from 1,500 to 1,000,000, is liquid at normal temperature and comprises $H_2SiO_{2/2}$ units.

2. A process for the production of a cyclic dihydrogenpolysiloxane having a weight-average molecular weight ranging in value from 1,500 to 1,000,000, is liquid at normal temperature and comprises $H_2SiO_{2/2}$ units, wherein in said process;
dihydrogendichlorosilane is subjected to hydrolysis/condensation in a mixture of a non-polar organic solvent and water, and
a volatile cyclic dihydrogenpolysiloxanes is removed from the formed dihydrogenpolysiloxane.

3. A process for the production of a cyclic dihydrogenpolysiloxane having a weight-average molecular weight ranging in value from 1,500 to 1,000,000, is liquid at normal temperature and comprises $H_2SiO_{2/2}$ units, wherein in said process;
dihydrogendichlorosilane is subjected to hydrolysis/condensation in a mixture of a non-polar organic solvent, hydrochloric acid and an ionic surface active agent, and
a volatile cyclic dihydrogenpolysiloxanes is removed from the formed dihydrogenpolysiloxane.

4. A hydrogenpolysiloxanes having an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000, and which is liquid at temperatures of not more than 120° C.

5. A process for the production of a hydrogenpolysiloxane having an average siloxane unit formula of $[H_2SiO_{2/2}]_x$ $[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000 and which is liquid at temperatures of less than 120° C., wherein in said process;
(a) dihydrogendichlorosilane, (b) hydrogentrichlorosilane, and (c) tetraalkoxysilane or tetrachlorosilane are subjected to co-hydrolysis/condensation in mole ratios such that $0.12 \leq (a) < 1.0$, $0 \leq (b) \leq 0.88$, $0 \leq (c) \leq 0.30$, (b) and (c) are not simultaneously 0, and $(a)+(b)+(c)=1$ in a mixture of a non-polar organic solvent, hydrochloric acid, and an ionic surface active agent.

6. The process for the production of the hydrogenpolysiloxane according to claim 5, wherein the non-polar organic solvent is toluene or xylene and the ionic surface active agent is selected from the group comprising aliphatic sulfonic acids, alkali metal salts of aliphatic sulfonic acids, alkylbenzenesulfonic acids, alkali metal salts of alkylbenzenesulfonic acids, and quaternary ammonium salts.

7. A process for the production of a hydrogenpolysiloxane which is represented by the average siloxane unit formula $[H_2SiO_{2/2}]_v[HSiO_{3/2}]_w$ (where v and w represent mole fractions, $0.12 \leq v < 1.0$, $0 < w \leq 0.88$, and $v+w=1.0$), has a weight-average molecular weight ranging in value from 500 to 1,000,000 and is liquid at temperatures of less than 120° C., wherein in said process;
dihydrogendichlorosilane is subjected to hydrolysis/condensation in a mixture of a non-polar organic solvent and water, and
the formed dihydrogenpolysiloxanes is branched by mixing the non-polar organic solvent containing the formed dihydrogenpolysiloxane, a protonic polar solvent and an inorganic acid.

8. The process for the production of the hydrogenpolysiloxane according to claim 7, wherein the non-polar organic solvent is toluene or xylene, the inorganic acid is sulfuric acid, hydrochloric acid, nitric acid, or phosphoric acid, and the protonic polar solvent is an alcohol or an aliphatic carboxylic acid.

9. A process for the production of a silica type glass molding with an optical transmittance of 90% to 100% in the vacuum-UV region at 170 nm or higher to UV region and an optical transmittance of 98% to 100% in the visible region to near infrared region up to 1700 nm, wherein in said process;
(A) a cyclic dihydrogenpolysiloxane that has a weight-average molecular weight ranging in value from 1,500 to 1,000,000, is liquid at normal temperature, and comprises $H_2SiO_{2/2}$ units, or
(B) a hydrogenpolysiloxane that has an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000 and that is liquid at temperatures of less than 120° C.,
is placed into a mold and made more flowable by maintaining it at a temperature of less than 120° C. to avoid curing, whereupon the cyclic dihydrogenpolysiloxane (A) or the hydrogenpolysiloxane (B) is cured to form the silica type glass molding, which are removed from the mold.

10. The process for the production of the silica type glass molding according to claim 9, wherein the cyclic dihydrogenpolysiloxane (A) or the hydrogenpolysiloxane (B) is cured by heating at a temperature of not less than 150° C. under an oxygen gas-containing atmosphere, heating at a temperature of not less than 200° C. in an inert gas or vacuum, or irradiation with high-energy rays or exposure to high-energy irradiation.

11. A silica type glass molding obtained as a cured product of the cyclic dihydrogenpolysiloxane (A) or as a cured product of the hydrogenpolysiloxane (B) according to claim 9 and having an optical transmittance of 90% to 100% in the vacuum-UV region at 170 nm or higher to UV region and an optical transmittance of 98% to 100% in the visible region to near infrared region up to 1700 nm.

12. An optical element comprising silica type glass obtained as a cured product of the cyclic dihydrogenpolysiloxane (A) or as a cured product of the hydrogenpolysiloxane (B) according to claim 9 and having an optical transmittance of 90% to 100% in the vacuum-UV region at 170 nm or higher to UV region and an optical transmittance of 98% to 100% in the visible region to near infrared region up to 1700 nm.

13. A process for the production of an optical element having a film layer of silica type glass with an optical transmittance of 90% to 100% in the vacuum-UV region at 170 nm or higher to UV region and an optical transmittance of 98% to 100% in the visible region to near infrared region up to 1700 nm, wherein in said process;
(A) a cyclic dihydrogenpolysiloxane that has a weight-average molecular weight ranging in value from 1,500 to 1,000,000, is liquid at normal temperature, and comprises $H_2SiO_{2/2}$ units, or
(B) a hydrogenpolysiloxane that has an average siloxane unit formula of $[H_2SiO_{2/2}]_x[HSiO_{3/2}]_y[SiO_{4/2}]_z$ (wherein x, y, and z represent mole fractions, $0.12 \leq x < 1.0$, $0 \leq y \leq 0.88$, $0 \leq z \leq 0.30$, y and z are not simultaneously 0, and $x+y+z=1$) and a weight-average molecular weight ranging in value from 500 to 1,000,000 and that is liquid at temperatures of less than 120° C., is diluted with an organic solvent or made more flowable by maintaining it at a temperature of less than 120° C. to avoid curing, coated on an optical member with an optical transmittance of 90% to 100% in the vacuum-UV region to UV region and an optical transmittance of 98% to 100% in the visible region to near infrared region, and made solvent-free via volatilization of the organic solvent by maintaining it at a temperature of less than 120° C. to avoid curing, whereupon the cyclic dihydrogenpolysiloxane (A) or the hydrogenpolysiloxane (B) is cured.

14. The process for the production of the optical element according to claim 13, wherein the cyclic dihydrogenpolysiloxane (A) or the hydrogenpolysiloxane (B) is cured by heating at a temperature of not less than 150° C. under an oxygen gas-containing atmosphere, heating at a temperature of not less than 200° C. in an inert gas or vacuum, irradiation with high-energy rays or exposure to high-energy irradiation, exposure to ozone, exposure to nitrous oxide or exposure to wet ammonia.

15. An optical element, wherein a silica type glass film layer obtained as a cured product of the cyclic dihydrogenpolysiloxane (A) or as a cured product of the hydrogenpolysiloxane (B) according to claim 13 and having an optical transmittance of 90% to 100% in the vacuum-UV region at 170 nm or higher to UV region and an optical transmittance of 98% to 100% in the visible region to near infrared region up to 1700 nm is provided on an optical member having an optical transmittance of 90% to 100% in the vacuum-UV region to UV region and an optical transmittance of 98% to 100% in the visible region to near infrared region.

* * * * *

UNITED STATES PATENT AND TRADEMARK OFFICE
CERTIFICATE OF CORRECTION

PATENT NO. : 8,097,690 B2
APPLICATION NO. : 11/997888
DATED : January 17, 2012
INVENTOR(S) : Yukinari Harimoto et al.

It is certified that error appears in the above-identified patent and that said Letters Patent is hereby corrected as shown below:

Section (73) Assignee:

Delete:
"DOW CORNING TORAY COMPANY, LTD.     CHIYODA-KU, TOKYO, JAPAN"

Insert:
-- DOW CORNING CORPORATION          MIDLAND, MICHIGAN
   DOW CORNING TORAY COMPANY, LTD.  CHIYODA-KU, TOKYO, JAPAN --

Signed and Sealed this
Fifth Day of February, 2013

Teresa Stanek Rea
*Acting Director of the United States Patent and Trademark Office*